(12) United States Patent
Draznin

(10) Patent No.: US 7,940,729 B2
(45) Date of Patent: May 10, 2011

(54) ANALYSIS AND CONTROL OF TRAFFIC BASED ON IDENTIFIED PACKET CONTROL FUNCTIONS

(75) Inventor: Sagiv Draznin, Phoenix, AZ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 141 days.

(21) Appl. No.: 12/487,950

(22) Filed: Jun. 19, 2009

(65) Prior Publication Data
US 2010/0322087 A1 Dec. 23, 2010

(51) Int. Cl.
*H04B 7/216* (2006.01)
(52) U.S. Cl. .......................................... 370/335; 370/342
(58) Field of Classification Search .......... 370/252–254, 370/328–339; 709/223–226
See application file for complete search history.

(56) References Cited

U.S. PATENT DOCUMENTS

| 7,187,682 B2 * | 3/2007 | Soulhi et al. ................. 370/401 |
| 2006/0084429 A1 * | 4/2006 | Buvaneswari et al. ....... 455/424 |

* cited by examiner

*Primary Examiner* — Frank Duong

(57) ABSTRACT

A device receives packet control function (PCF) load information associated with a packet data serving node (PDSN), and determines PCF Internet protocol (IP) address information and a number of sessions per PCF based on the PCF load information. The device also receives IP information from an IP network associated with the PDSN, and determines PCF identity information based on the IP information. The device further generates control information based on the PCF IP address information, the number of sessions per PCF, and the PCF identity information, and provides the control information to the PDSN to control operation of the PDSN.

25 Claims, 11 Drawing Sheets

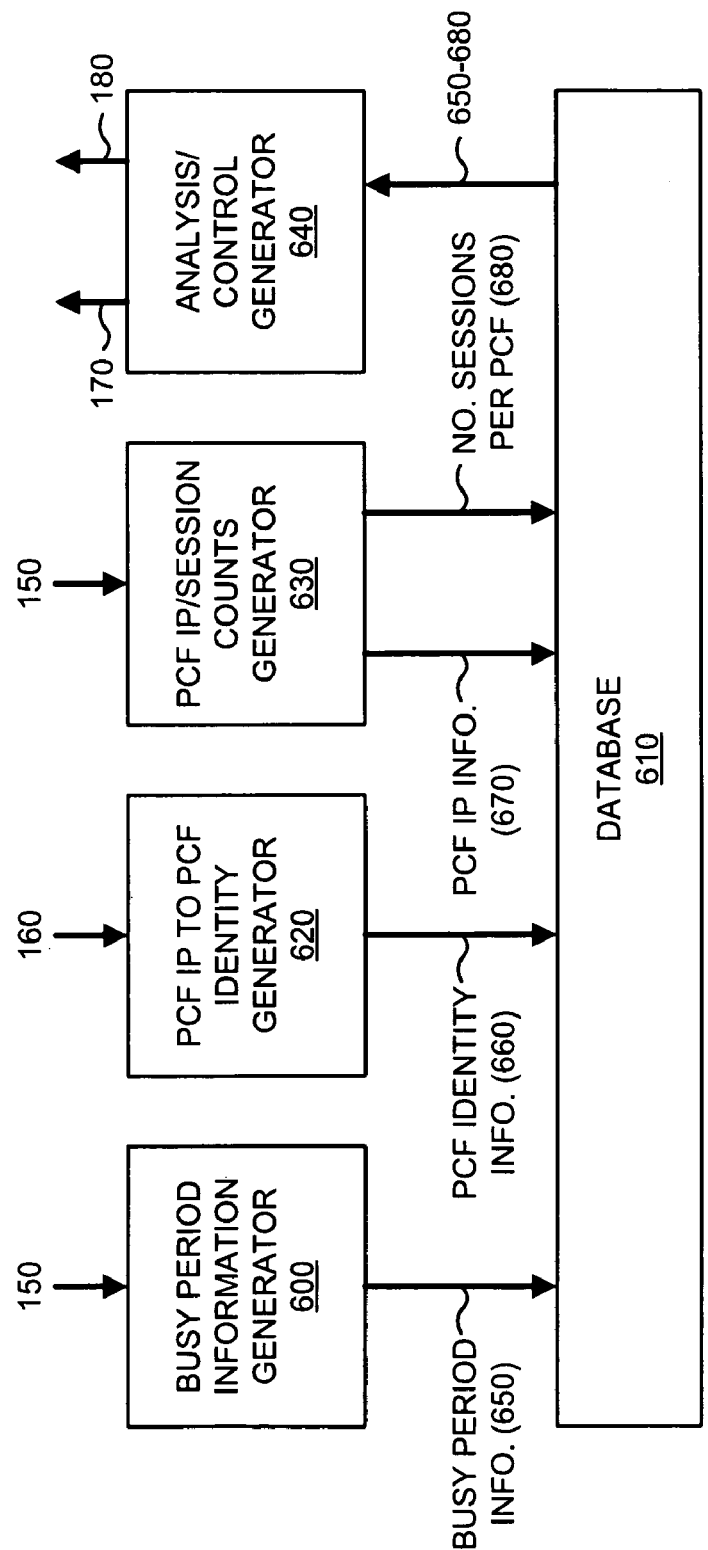

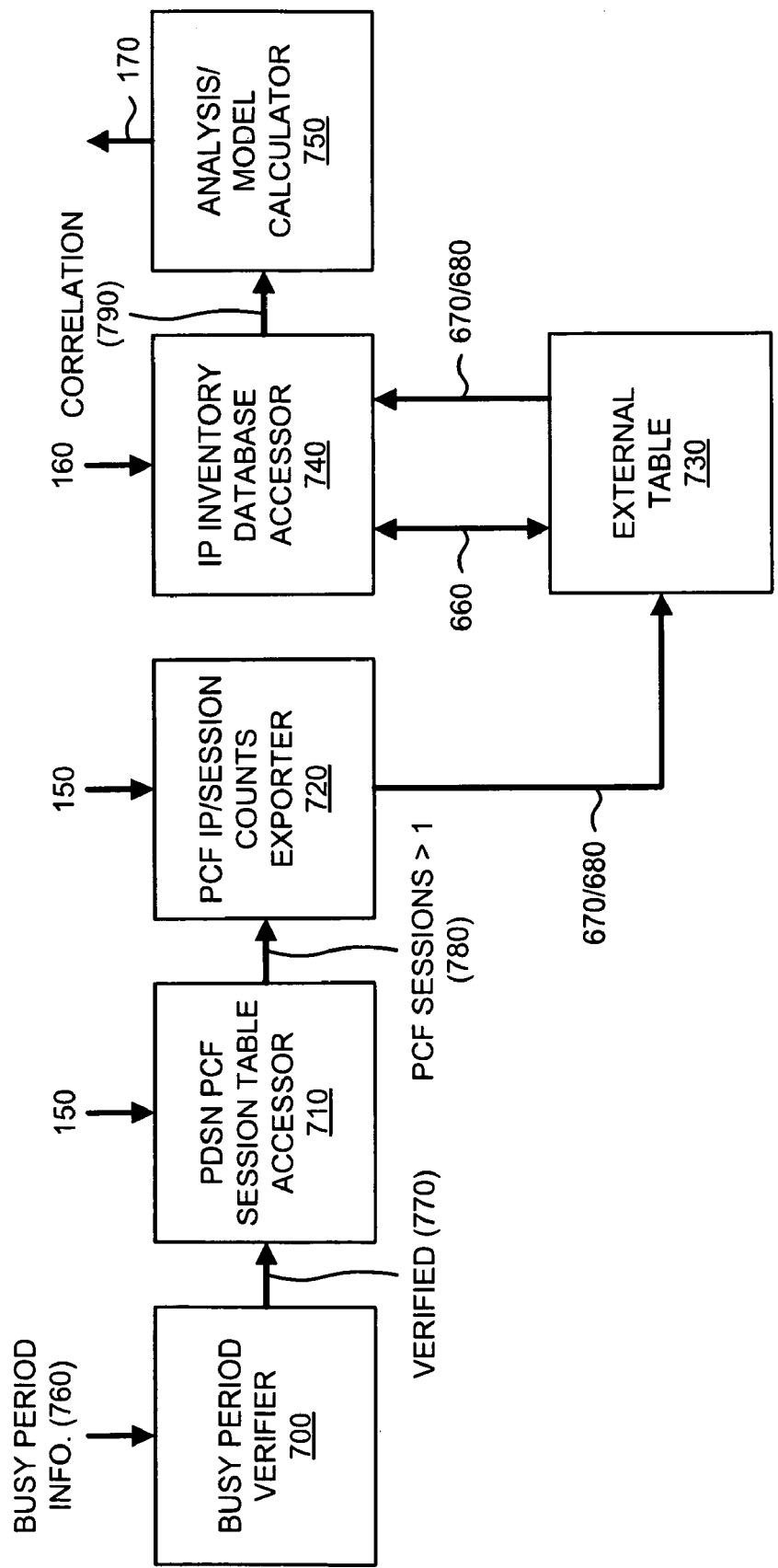

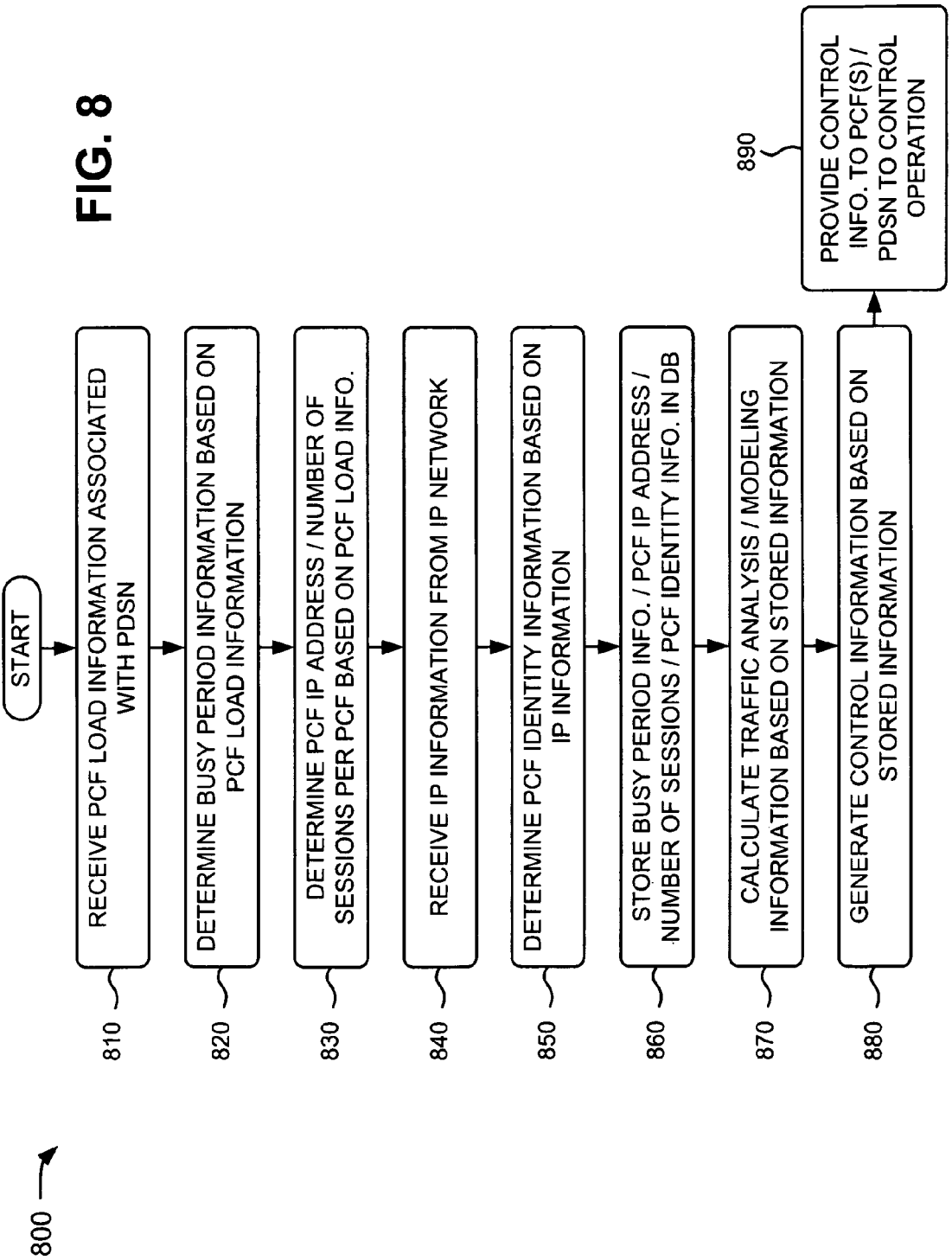

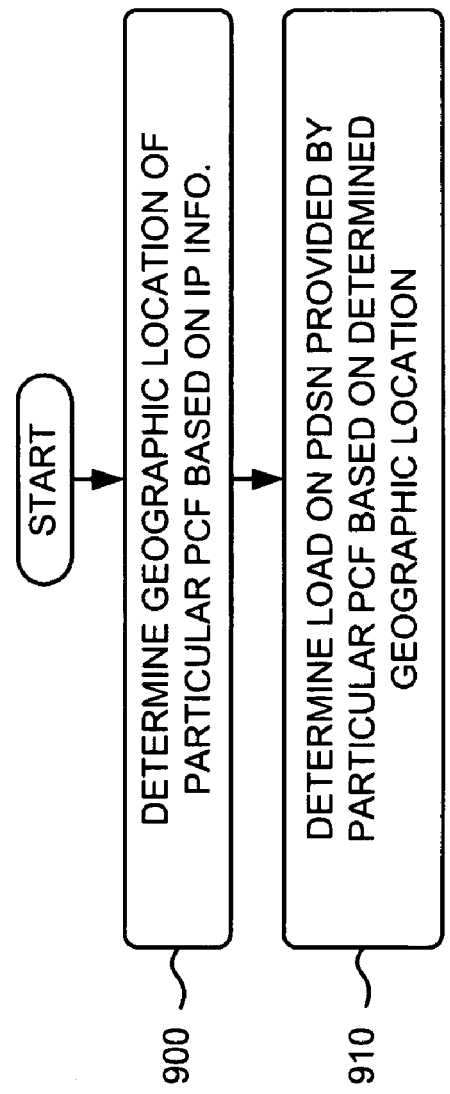

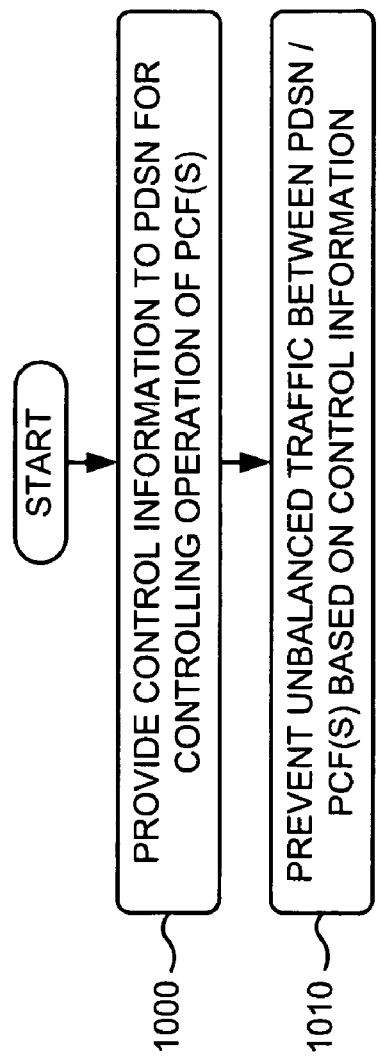

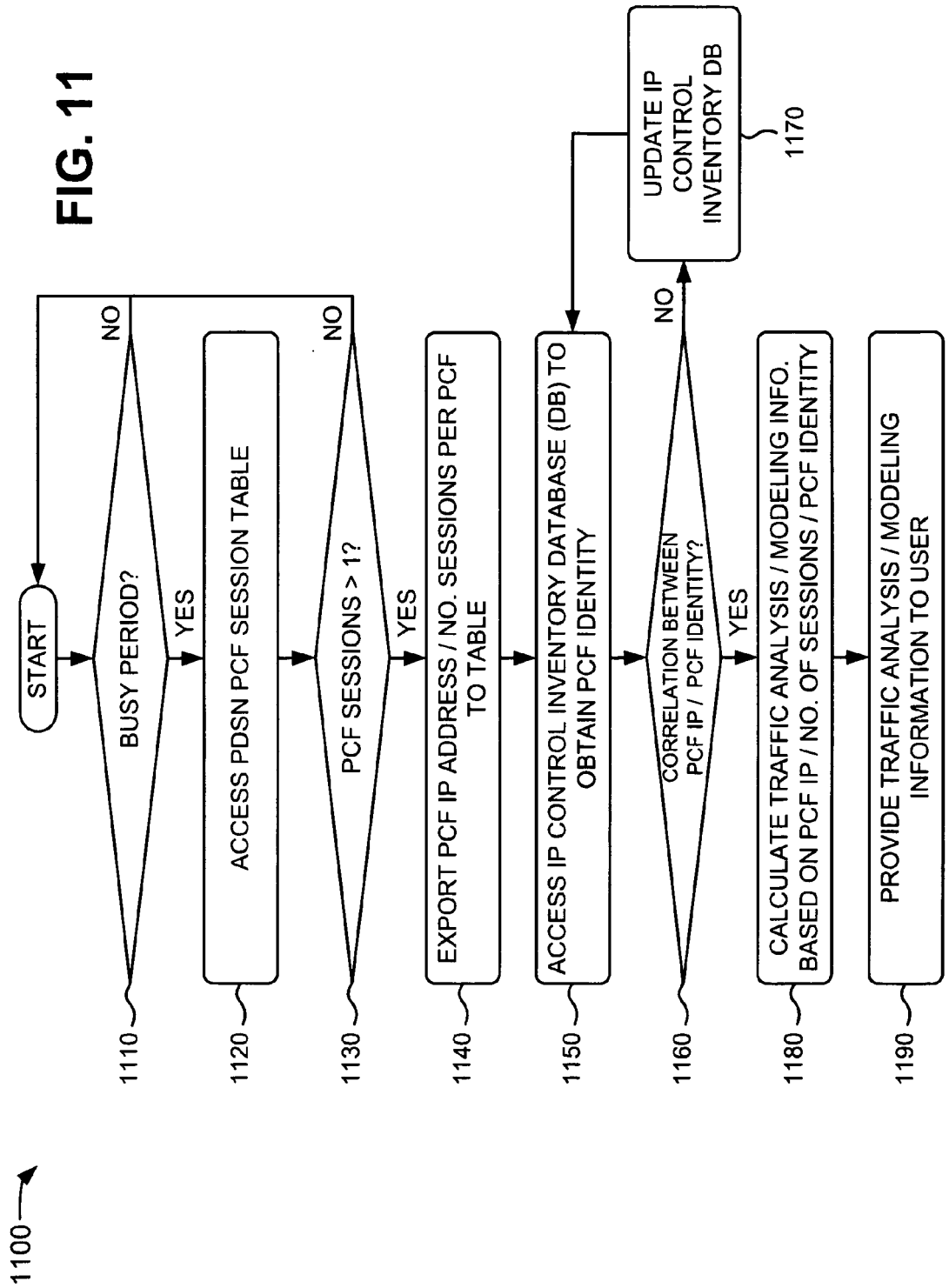

ANALYSIS AND CONTROL OF TRAFFIC BASED ON IDENTIFIED PACKET CONTROL FUNCTIONS

BACKGROUND

A Packet Data Serving Node (PDSN) is a component of a code division multiple access (CDMA) mobile network that acts as a connection point (e.g., a gateway) between a radio access network (RAN) and an Internet protocol (IP) network. A PDSN is responsible for managing point-to-point protocol (PPP) sessions between a mobile provider's IP network and a mobile device (e.g., a cell phone). A PDSN acts as an access gateway, provides foreign agent support, and provides packet transport for virtual private networking.

A PDSN may connect to one or more packet control functions (PCFs) provided in one or more radio access networks. A PCF is a device or entity that is coupled, at one end, to the PDSN, and is coupled, at another end, to the radio access network (e.g., to a base station) provided in the radio access network). Each PCF may control transmission of packets between a base station and the PDSN. The PCFs provide loads on the PDSN to which they are connected. PCF load information (e.g., PCF IP addresses, a number of sessions per PCF, etc.) may be collected and analyzed so that the PCF load on the PDSN may be balanced. However, knowledge of the PCF IP addresses and the number of sessions per PCF is typically insufficient for traffic analysis (e.g., traffic caused by transmission of packets), network modeling, and/or controlling of a PDSN/PCFs network. Without such traffic analysis and/or modeling, the traffic (e.g., the load) between the PCFs and the PDSN may not be controlled and may become unbalanced. Unbalanced traffic may cause the PDSN to become congested, operate inefficiently, and/or become inoperable.

BRIEF DESCRIPTION OF THE DRAWINGS

FIG. 6 illustrates a diagram of exemplary functional components of the analysis/control device depicted in FIG. 1;

FIG. 7 depicts a diagram of other exemplary functional components of the analysis/control device illustrated in FIG. 1;

FIGS. 8-10 illustrate flow charts of an exemplary process for analyzing and/or controlling traffic based on PCF identification according to implementations described herein; and FIG. 11 depicts a flow chart of an exemplary process for analyzing and/or modeling traffic based on PCF identification according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods that analyze and/or control traffic (e.g., that passes through a PDSN) based on PCF identification. In one implementation, for example, the systems and/or methods may receive load information associated with one or more PCFs coupled to a PDSN, and may determine PCF IP addresses and a number of sessions per PCF based on the load information. The systems and/or methods may receive IP information from an IP network, and may determine PCF identity information (e.g., geographic locations of the PCFs, etc.) based on the IP information. The systems and/or methods may utilize the PCF IP addresses, the number of sessions per PCF, and the PCF identity information to analyze (or model) traffic passing through the PDSN and to control the PCFs and/or the PDSN. Such an arrangement may enable the traffic (e.g., the load) between the PCFs and the PDSN to be controlled and/or balanced.

Figure 1:
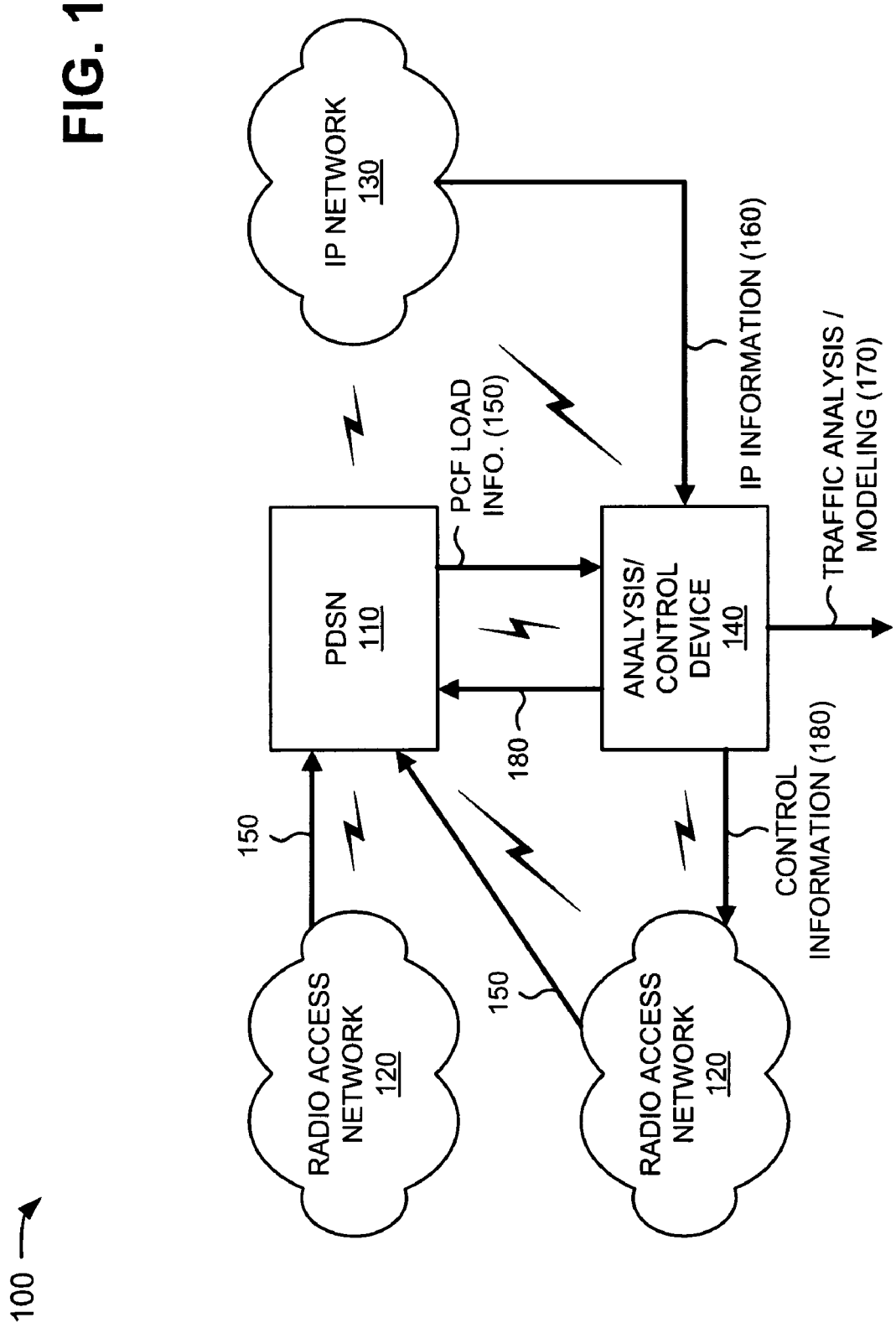
FIG. 1 depicts a diagram of an exemplary network in which systems and/or methods described herein may be implemented.

FIG. 1 is a diagram of an exemplary network 100 in which systems and/or methods described herein may be implemented. As illustrated, network 100 may include a PDSN 110, radio access networks 120, an IP network 130, and an analysis/control device 140. Components of network 100 may interconnect via wired and/or wireless connections. A single PDSN 110, two radio access networks 120, a single IP network 130, and a single analysis/control device 140 have been illustrated in FIG. 1 for simplicity. In practice, there may be more PDSNs 110, radio access networks 120, IP networks 130, and/or analysis/control devices 140. Also, in some instances, one or more of the components of network 100 may perform one or more functions described as being performed by another one or more of the components of network 100. For example, in one implementation, the tasks performed by analysis/control device 140 may be performed by PDSN 110.

PDSN 110 may include a device (e.g., of a CDMA mobile network) that acts as a connection point between a radio access network (e.g., radio access networks 120) and an IP network (e.g., IP network 130). For example, PDSN 110 may include a network device, such as a gateway, a router, a switch, a firewall, a network interface card (NIC), a hub, a bridge, a proxy server, or some other type of device that processes and/or transfers data. PDSN 110 may manage PPP sessions between a mobile provider's IP network (e.g., IP network 130) and a mobile device (e.g., a cell phone) connected to one of radio access networks 120. PDSN 110 may act as an access gateway, may provide foreign agent support, and may provide packet transport for virtual private networking. In one example, PDSN 110 may include a 1xRTT (radio transmission technology) PDSN, an evolution-data optimized (EVDO) PDSN, etc. Further details of PDSN 110 are provided below in connection with, for example, FIG. 3.

Each of radio access networks 120 (referred to herein as "radio access network 120") may include one or more devices for transmitting voice and/or data to/from user equipment (e.g., mobile communication devices, such as cell phones) and IP network 130. Radio access network 120 may include a group of base stations and a group of radio network controllers (RNCs). The base stations may receive voice and/or data from the RNCs and may transmit that voice and/or data to the user equipment via an air interface. The base stations may also receive voice and/or data from the user equipment over an air interface and may transmit that voice and/or data to the RNCs or other user equipment. The RNCs may control and manage the base stations, and may perform data processing to manage utilization of radio network services. The RNCs may transmit/receive voice and data to/from the base stations, other RNCs, and/or IP network 130.

In one exemplary implementation, radio access network 120 may include one or more PCFs. A PCF may include a device or entity that is coupled, at one end, to PDSN 110, and is coupled, at another end, to radio access network 120 (e.g., to a base station provided in radio access network 120). Each PCF may control transmission of datagrams between a base station and PDSN 110. A "datagram(s)" may include any type or form of data, such as packet or non-packet data. In one example, a PCF may correspond to a RNC provided in radio access network 120. Further details of radio access network 120 are provided below in connection with, for example, FIG. 4.

IP network 130 may include one or more networks of any type. For example, IP network 130 may include a local area network (LAN), a wide area network (WAN), a metropolitan area network (MAN), a telephone network, such as the Public Switched Telephone Network (PSTN) or Public Land Mobile Network (PLMN), an intranet, the Internet, an optical fiber (or fiber optic)-based network, or a combination of networks. In one exemplary implementation, IP network 130 may include a network utilizing an Internet protocol. Further details of IP network 130 are provided below in connection with, for example, FIG. 5.

Analysis/control device 140 may include one or more server entities, or other types of computation or communication devices, that gather, process, search, and/or provide information in a manner described herein. In one implementation, analysis/control device 140 may analyze and/or control traffic (e.g., provided to/from radio access networks 120 and IP network 130, via PDSN 110) based on identification of PCFs associated with radio access networks 120. Further details of analysis/control device 140 are provided below in connection with, for example, FIGS. 6 and 7.

In one example, as further shown in FIG. 1, PDSN 110 may receive load information 150, associated with one or more PCFs (e.g., provided in radio access network 120), from radio access networks 120, and may provide PCF load information 150 to analysis/control device 140. PCF load information 150 may include information associated with loads provided to PDSN 110 via the PCFs associated with radio access network 120. For example, PCF load information 150 may include a number of packets, traversing PDSN 110, that are provided by the PCFs associated with radio access network 120, IP addresses associated with the PCFs, a number of sessions (per PCF) currently being processed by PDSN 110, etc. However, as described above, knowledge of the PCF IP addresses and the number of sessions per PCF is typically insufficient for traffic analysis (e.g., traffic caused by transmission of packets) and/or network modeling. PDSN 110 may act as a "multicast" device (e.g., several PCFs, from different locations, may communicate with PDSN 110), which may create uncertainty as to where a load (e.g., from which PCFs) on PDSN 110 is emanating. Thus, PDSN 110 may experience a load from an unwanted, geographically-situated PCF (e.g., a PCF in an unwanted location relative to PDSN 110), but may not be able to determine the geographical location of the unwanted PCF.

For PCF load information 150 to be useful, names (or identities) of the PCFs may be determined. In one example, the PCF identities may be determined based on geographic locations of RNCs (e.g., of radio access networks 120) associated with the PCFs. The PCF identities (e.g., the geographic locations of RNCs) may be determined based on IP information 160 associated with IP network 130. As shown in FIG. 1, IP network 130 may provide IP information 160 to analysis/control device 140. IP information 160 may include IP address information associated with sessions provided to PCFs (e.g., provided in radio access networks 120) from IP network 130 and via PDSN 110, prefixes associated with the PCFs, etc.

Analysis/control device 140 may receive PCF load information 150, and may determine PCF IP addresses and a number of sessions per PCF based on PCF load information 150. Analysis/control device 140 may receive IP information 160 from IP network 130, and may determine PCF identity information (e.g., geographic locations of the PCFs, etc.) based on IP information 160. Analysis/control device 140 may utilize the PCF IP addresses, the number of sessions per PCF, and the PCF identity information to analyze and/or model traffic passing through PDSN 110, as shown by reference number 170. Traffic analysis/modeling 170 may include statists associated with the PCFs (e.g., load per PCF, capacity of PDSN 110 utilized by each PCF, percent of sessions utilized by each PCF, etc.). Analysis/control device 140 may provide traffic analysis/modeling 170 to a network user (e.g., a network engineer, a network operator, etc.), and the network user may utilize traffic analysis/modeling 170 to prevent unbalanced traffic from occurring at PDSN 110.

Analysis/control device 140 may utilize the PCF IP addresses, the number of sessions per PCF, and the PCF identity information to control the PCFs and/or PDSN 110, as shown by reference number 180. Analysis/control device 140 may provide control information 180 to the PCFs and/or PDSN 110. Control information 180 may include information instructing the PCFs and/or PDSN 110 on how and when to provide traffic to/from PDSN 110. Control information 180 may enable the traffic (e.g., the load) between the PCFs and PDSN 110 to be controlled and/or balanced.

Analysis/control device 140 may collect and/or analyze PCF load information 150 so that the PCF load on PDSN 110 may be controlled and/or balanced. Analysis/control device 140 may analyze load information 150 for PCFs by reviewing PCF tables (e.g., stored in PDSN 110) to determine configured PCFs, by reviewing PCF table entries to determine a number of sessions per PCF, by verifying if PDSN 110 is experiencing busy conditions (e.g., a time of day, such as lunch time, when PDSN 110 is experiencing a larger load than other times of the day), etc.

Figure 2:
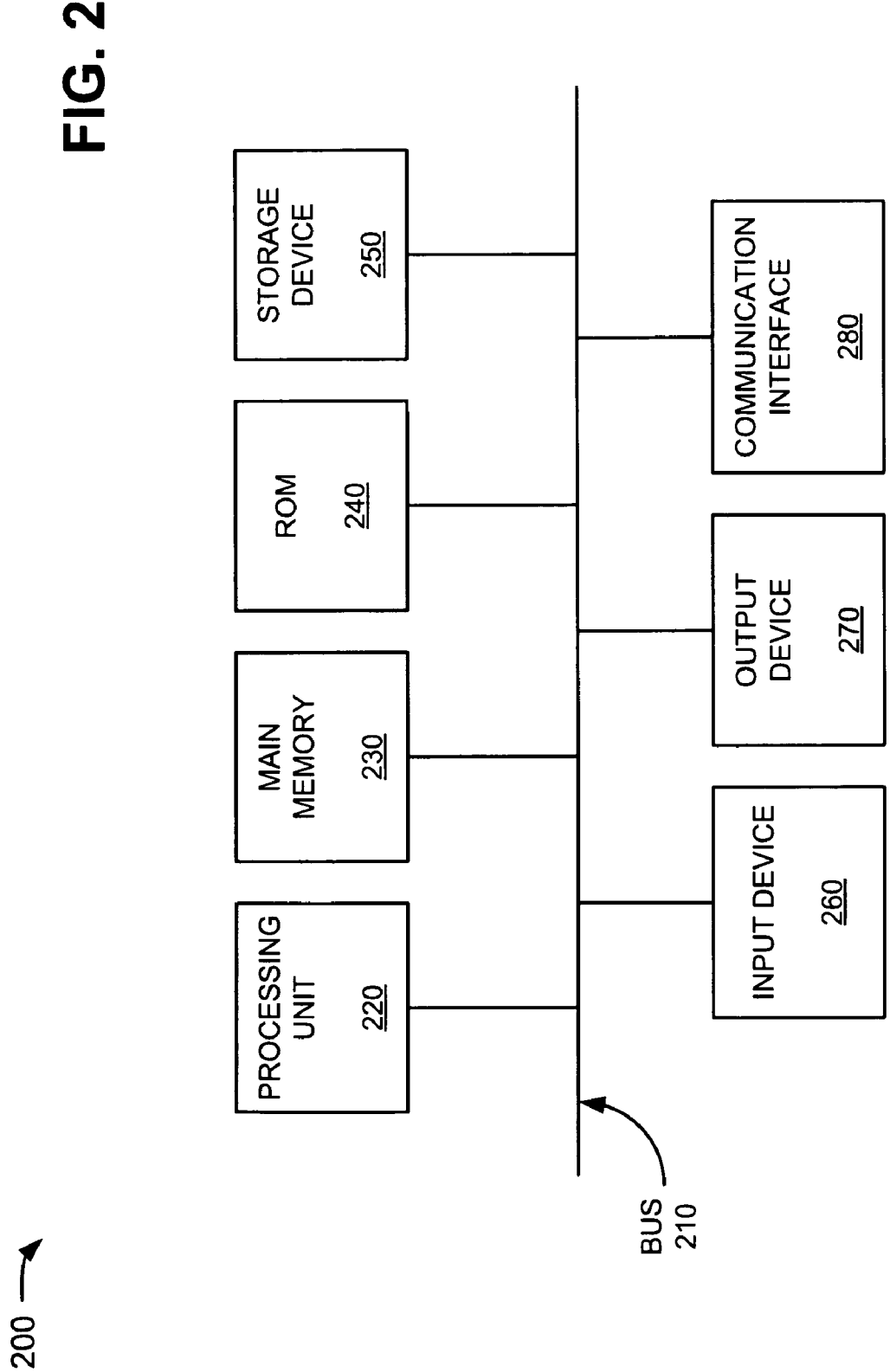
FIG. 2 illustrates a diagram of exemplary components of a PDSN and/or an analysis/control device of the network depicted in FIG. 1.

FIG. 2 is an exemplary diagram of a device 200 that may correspond to PDSN 110 and/or analysis/control device 140. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include one or more random access memories (RAMs) or other types of dynamic storage devices that may store information and instructions for execution by processing unit 220. ROM 240 may include one or more ROM devices or other types of static storage devices that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a remote control, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Figure 3:
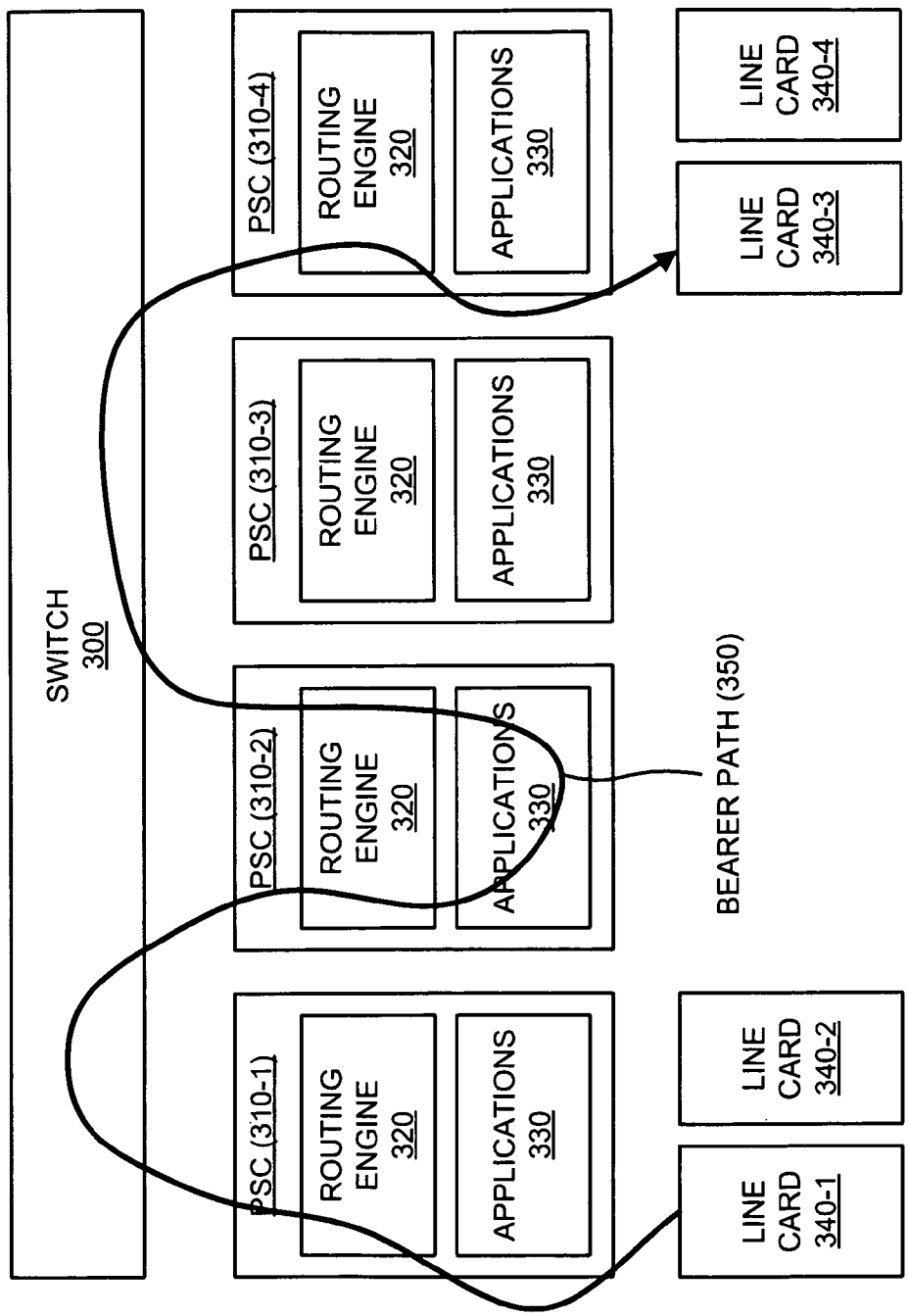
FIG. 3 depicts a diagram of additional exemplary components of the PDSN illustrated in FIG. 1.

FIG. 3 depicts a diagram of additional exemplary components of PDSN 110. As shown, PDSN 110 may include a switch 300; one or more packet-switch capable (PSC) interfaces 310-1, . . . , 310-4 (referred to collectively as "packet-switch capable interfaces 310" and in some instances, individually as "packet-switch capable interface 310") that include routing engines 320 and applications 330; and one or more line cards 340-1, . . . , 340-4 (referred to collectively as "line cards 340" and in some instances, individually as "line card 340"). Components of PDSN 110 may interconnect via wired and/or wireless connections.

Switch 300 may include a device that channels incoming datagrams from any of multiple input ports to an output port that takes the datagrams toward its intended destination. Switch 300 may include a bus, a crossbar, and/or a shared memory. A bus may link packet-switch capable interfaces 310 and line cards 340. A crossbar may provide multiple simultaneous data paths through switch 300. In a shared-memory, incoming datagrams may be stored in a shared memory and pointers to datagrams may be switched. In one exemplary implementation, switch 300 may include a three-hundred and twenty gigabyte switch.

Packet-switch capable interface 310 may include an interface used to receive and transmit datagrams, such as IP packets, Asynchronous Transfer Mode (ATM) cells, Frame Relay frames, Ethernet frames, etc. Packet-switch capable interface 310 may forward these datagrams based on an encapsulated label, various fields, etc.

Routing engine 320 may include a device (e.g., one or more processors, microprocessors, etc.) that provides central processing, route processing, and storage (e.g., for an operating system) for packet-switch capable interface 310. Routing engine 320 may execute protocols, may store and keep routing tables up-to-date, may perform management of packet-switch capable interface 310, etc. In one exemplary implementation, routing engine 320 may install and update a routing table when PDSN 300 is initiated (e.g., booted up) and/or when there are updates to the routing table.

Applications 330 may include one or more protocols, routing tables, applications for managing packet-switch capable interface 310, applications for routing datagrams, etc.

Line card 340 may include a device (e.g., an electronic circuit on a printed circuit board) that provides an interface for receipt and/or transmission of datagrams. Line card 340 may carry out datalink layer encapsulation and decapsulation, and/or a variety of higher-level protocols. Line card 340 may look up a destination address of an incoming datagram in a forwarding table to determine its destination port (i.e., route lookup). Line card 340 may store datagrams before they are transmitted on an output link.

As further shown in FIG. 3, an exemplary bearer path 350 may be provided through PDSN 110 and may include a communication path for datagrams. Bearer path 350 may enter PDSN 110 via line card 340-1, may travel through routing engine 320 of packet-switch capable interface 310-1 (e.g., an ingress PSC), and may continue to switch 300. Switch 300 may provide bearer path 350 to routing engine 320 of packet-switch capable interface 310-2 (e.g., an application-executing PSC), and packet-switch capable interface 310-2 may execute one of applications 330 and provide bearer path 350 to switch 300. Switch 300 may provide bearer path 350 to routing engine 320 of packet-switch capable interface 310-4 (e.g., an egress PSC), and packet-switch capable interface 310-4 may provide bearer path 350 to line card 340-3. Bearer path 350 may exit PDSN 110 via line card 340-3.

Although FIG. 3 shows exemplary components of PDSN 110, in other implementations, PDSN 110 may contain fewer, different, differently arranged, or additional components than depicted in FIG. 3. In still other implementations, one or more components of PDSN 110 may perform one or more other tasks described as being performed by one or more other components of PDSN 110.

Figure 4:
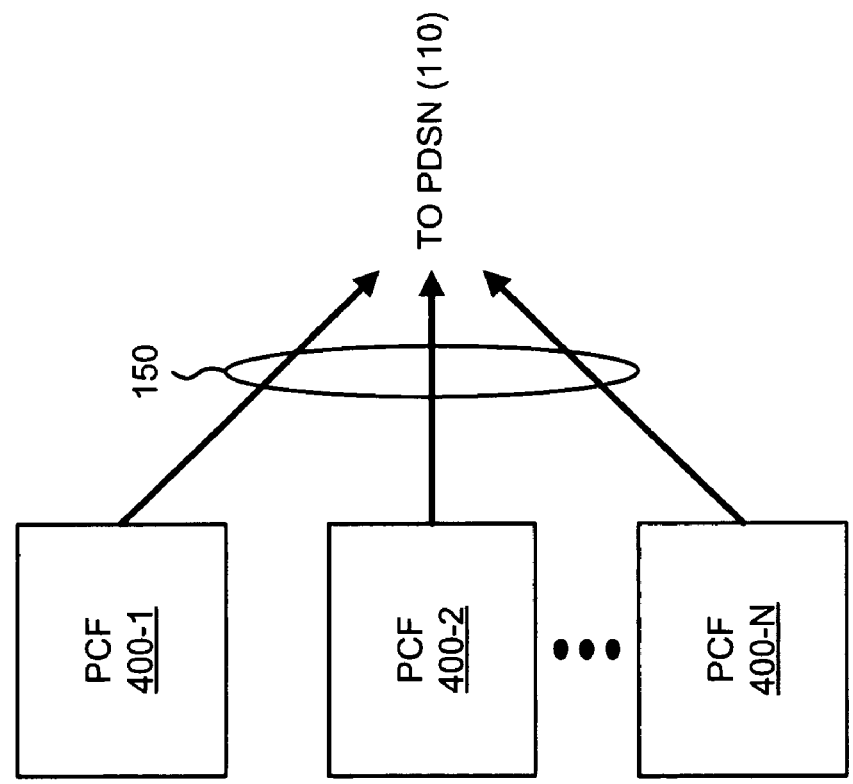
FIG. 4 illustrates a diagram of exemplary components of a radio access network depicted in FIG. 1.

FIG. 4 illustrates a diagram of exemplary components of radio access network 120. As shown, radio access network 120 may include one or more PCFs 400-1, . . . , 400-N (referred to collectively as "PCFs 400" and in some instances, individually as "PCF 400"). In one exemplary implementation, PCFs 400 may be incorporated in one or more RNCs (not shown) associated with radio access network 120.

PCF 400 may include a device or entity that is coupled, at one end, to PDSN 110, and is coupled, at another end, to radio access network 120 (e.g., to a base station provided in radio access network 120). PCF 400 may control transmission and/or receipt of datagrams provided between a base station and PDSN 110. PCFs 400 may provide loads on PDSN 110. As further shown in FIG. 4, PCF load information 150 (e.g., PCF IP addresses, number of sessions per PCF, etc.) may be provided to PDSN 110, and PDSN 110 may provide load information 150 to analysis/control device 140. In one exemplary implementation, one or more of PCFs 400 may be associated with different radio access networks 120.

Although FIG. 4 shows exemplary components of radio access network 120, in other implementations, radio access network 120 may contain fewer, different, differently arranged, or additional components than depicted in FIG. 4. In still other implementations, one or more components of radio access network 120 may perform one or more other tasks described as being performed by one or more other components of radio access network 120.

Figure 5:
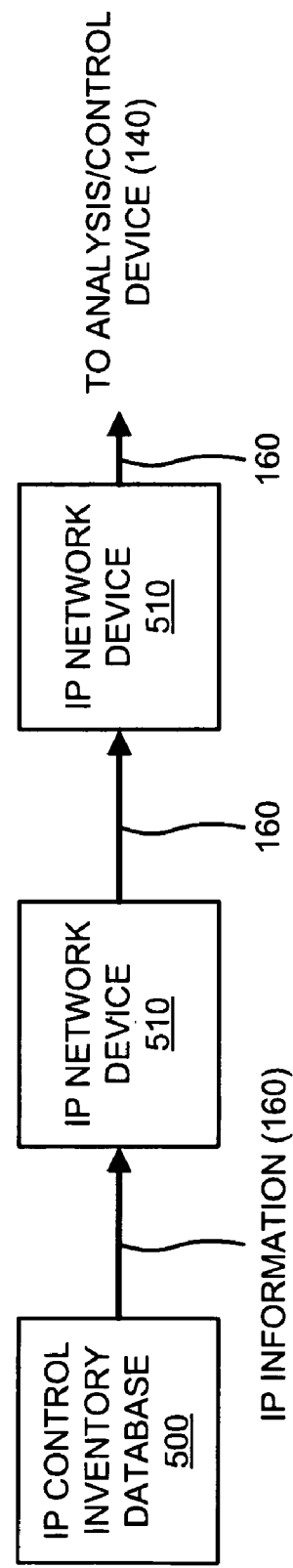
FIG. 5 depicts a diagram of exemplary components of an IP network illustrated in FIG. 1.

FIG. 5 depicts a diagram of exemplary components of IP network 130. As shown, IP network 130 may include an IP control inventory database 500 and one or more IP network devices 510.

IP control inventory database 500 may include one or more storage devices that may store information received by and/or provided to IP network 130. In one implementation, IP control inventory database 500 may store IP information 160, such IP address information associated with sessions provided to PCFs (e.g., provided in radio access networks 120) from IP network 130 and via PDSN 110. For example, IP control inventory database 500 may store IP address management (IPAM) functions; allocation and/or reallocation information; information that enables management of IP address space, subnets, and individual address assignment; information that enables configuration of individual IP addresses, ranges, or address pools within IP network 130; information that enables automated IP address allocation; user-defined policy information; IP address utilization trends and forecasts; information that supports failover, multi-tiered addressing, and multi-homed hosts; etc. Although FIG. 5 shows IP control inventory database 500 as separate from IP network devices 510, in other implementations, IP control inventory database 500, or a portion of IP control inventory database 500, may be incorporated in one or more of IP network devices 510.

IP network device 510 may include a data transfer device, such as a gateway, a router, a switch, a firewall, a NIC, a hub, a bridge, a proxy server, an optical add-drop multiplexer (OADM), or some other type of device that processes and/or transfers datagrams. In one implementation, as shown in FIG. 5, one of IP network devices 510 may receive IP information 160 (e.g., from IP control inventory database 500), and may forward IP information 160 to another IP network device 510. The other IP network device 510 may receive IP information 160, and may forward IP information 160 to analysis/control device 140.

Although FIG. 5 shows exemplary components of IP network 130, in other implementations, IP network 130 may contain fewer, different, differently arranged, or additional components than depicted in FIG. 5. In still other implementations, one or more components of IP network 130 may perform one or more other tasks described as being performed by one or more other components of IP network 130.

FIG. 6 illustrates a diagram of exemplary functional components of analysis/control device 140. In one implementation, the functions described in connection with FIG. 6 may be performed by one or more components of device 200 (FIG. 2). As shown in FIG. 6, analysis/control device 140 may include a busy period information generator 600, a database 610, a PCF IP to PCF identity generator 620, a PCF IP/session counts generator 630, and an analysis/control generator 640.

Busy period information generator 600 may include hardware or a combination of hardware and software that may receive PCF load information 150 from PDSN 110, and may generate busy period information 650 based on PCF load information 150. Busy period information 650 may include information associated with when PDSN 110 is experiencing busy conditions (e.g., a time of day when PDSN 110 is experiencing a larger load than other times of the day), etc. For example, busy period information 650 may include information indicating that PDSN 110 experiences the greatest loads between 1 PM and 3 PM during weekdays and between 7 PM and 10 PM during weekends. Busy period information generator 600 may provide busy period information 650 to database 610 for storage.

Database 610 may include one or more storage devices that may store information received by and/or provided to analysis/control device 140. In one implementation, database 610 may store busy period information 650, PCF identity information, PCF IP information, a number of sessions per PCF, etc.

PCF IP to PCF identity generator 620 may include hardware or a combination of hardware and software that may receive IP information 160 from IP network 130, and may generate PCF identity information 660 based on IP information 160. PCF identity information 660 may include information identifying names of PCFs 400, geographic locations associated with PCFs 400, geographic locations associated with RNCs containing PCFs 400, etc. In one example, PCF identity information 660 may include prefixes (e.g., provided in IP information 160) associated with PCFs 400. PCF IP to PCF identity generator 620 may provide PCF identity information 660 to database 610 for storage.

PCF IP/session counts generator 630 may include hardware or a combination of hardware and software that may receive PCF load information 150 from PDSN 110, and may generate PCF IP information 670 and a number 680 of sessions per PCF based on PCF load information 150. PCF IP information 670 may include IP addresses associated with PCFs 400 at PDSN 110. Number 680 of sessions per PCF may include a number of sessions (per PCF 400) currently being processed by PDSN 110. PCF IP/session counts generator 630 may provide PCF IP information 670 and number 680 of sessions per PCF to database 610 for storage.

Analysis/control generator 640 may include hardware or a combination of hardware and software that may retrieve busy period information 650, PCF identity information 660, PCF IP information 670, and/or number 680 of sessions per PCF from database 610, and may determine traffic analysis/modeling 170 and/or control information 180 based on the retrieved information. For example, analysis/control generator 640 may verify if PDSN 110 is experiencing busy conditions (e.g., a time of day when PDSN 110 is experiencing a larger load than other times of the day) based on busy period information 650. In another example, analysis/control generator 640 may correlate PCF identity information 660 with PCF IP information 670 and number 680 of sessions per PCF to determine a load on PDSN 110 from specific PCFs 400. This may enable the network user to prevent unbalanced traffic from occurring at PDSN 110, and may enable the traffic (e.g., the load) between PCFs 400 and PDSN 110 to be controlled and/or balanced.

Although FIG. 6 shows exemplary functional components of analysis/control device 140, in other implementations, analysis/control device 140 may contain fewer, different, differently arranged, or additional functional components than depicted in FIG. 6. In still other implementations, one or more functional components of analysis/control device 140 may perform one or more other tasks described as being performed by one or more other functional components of analysis/control device 140.

FIG. 7 depicts a diagram of other exemplary functional components of analysis/control device 140. In one implementation, the functions described in connection with FIG. 7 may be performed by one or more components of device 200 (FIG. 2). As shown in FIG. 7, analysis/control device 140 may include a busy period verifier 700, a PDSN PCF session table accessor 710, a PCF IP/session counts exporter 720, an external table 730, an IP inventory database accessor 740, and an analysis/model calculator 750.

Busy period verifier 700 may include hardware or a combination of hardware and software that may receive busy period information 760 (e.g., from PDSN 110), and may verify whether PDSN 110 is currently experiencing busy conditions. Busy period information 760 may include information similar to busy period information 650, as described above in connection with FIG. 6. If PDSN 110 is currently experiencing busy conditions, busy period verifier 700 may provide an indication 770, verifying that PDSN 110 is currently experiencing busy conditions, to PDSN PCF session table accessor 710.

PDSN PCF session table accessor 710 may include hardware or a combination of hardware and software that may receive indication 770, and may access a PCF session table (e.g., provided in PDSN 110) based on indication 770. PDSN PCF session table accessor 710 may retrieve PCF load information 150 from the PCF session table, and may determine, based on PCF load information 150, whether the PCF session table includes more than one PCF session. If the PCF session table includes more than one PCF session, PDSN PCF session table accessor 710 may provide, to PCF IP/session counts exporter 720, an indication 780 that the PCF session table includes more than one PCF session. If the PCF session table does not include more than one PCF session, analysis/control device 140 may retrieve busy period information 760 again (e.g., via busy period verifier 700).

PCF IP/session counts exporter 720 may include hardware or a combination of hardware and software that may receive indication 780, and may access PCF load information 150 (e.g., from PDSN 110) based on indication 780. PCF IP/session counts exporter 720 may extract PCF IP information 670 and number 680 of sessions per PCF (FIG. 6) from PCF load information 150, may correlate PCF IP information 670 and number 680 of sessions per PCF, and may export the correlated PCF IP information 670 and number 680 of sessions per PCF to external table 730.

External table 730 may include one or more tables (e.g., provided in database 610 (FIG. 6)) that receives PCF identity information 660 from IP inventory database accessor 740 (e.g., based on IP information 160), and receives PCF IP information 670 and number 680 of sessions per PCF from PCF IP/session counts exporter 720. External table 730 may store PCF identity information 660, PCF IP information 670, and number 680 of sessions per PCF in the one or more tables.

IP inventory database accessor 740 may include hardware or a combination of hardware and software that may access IP control inventory database 500 (FIG. 5), and may retrieve IP information 160 from IP control inventory database 500. IP inventory database accessor 740 may extract PCF identity information 660 from IP information 160, and may provide PCF identity information 660 to external table 730 for storage. IP inventory database accessor 740 may retrieve PCF identity information 660, PCF IP information 670, and number 680 of sessions per PCF from external table 730, and may determine if there is a correlation between PCF identity information 660 and PCF IP information 670. If there is a correlation between PCF identity information 660 and PCF IP information 670, IP inventory database accessor 740 may provide, to analysis/model calculator 750, an indication 790 that there is a correlation. If there is no correlation between PCF identity information 660 and PCF IP information 670, IP inventory database accessor 740 may update IP control inventory database 500 with such information.

Analysis/model calculator 750 may include hardware or a combination of hardware and software that may receive correlation indication 790 from IP inventory database accessor 740, and may generate traffic analysis/modeling 170 based on indication 790. For example, analysis/model calculator 750 may generate, for a network user, a table that includes PCF identity information 660, PCF IP information 670, and number 680 of sessions per PCF; statistics comparing the loads provided by each PCF 400 connected to PDSN 110; statistics showing time of day when the load on PDSN 110 is the smallest and/or the greatest; etc. Analysis/model calculator 750 may provide traffic analysis/modeling 170 for display to a network user, to a storage device (e.g., for retrieval and review by the network user), and/or to a device (e.g., a computer) associated with the network user.

Although FIG. 7 shows exemplary functional components of analysis/control device 140, in other implementations, analysis/control device 140 may contain fewer, different, differently arranged, or additional functional components than depicted in FIG. 7. In still other implementations, one or more functional components of analysis/control device 140 may perform one or more other tasks described as being performed by one or more other functional components of analysis/control device 140.

FIGS. 8-10 illustrate flow charts of an exemplary process 800 for analyzing and/or controlling traffic based on PCF identification according to implementations described herein. In one implementation, process 800 may be performed by analysis/control device 140. In another implementation, some or all of process 800 may be performed by another device or group of devices (e.g., PDSN 110), including or excluding analysis/control device 140.

As illustrated in FIG. 8, process 800 may include receipt of PCF load information associated with a PDSN (block 810), determining busy period information based on the PCF load information (block 820), and determining PCF IP address information and/or a number of sessions per PCF based on the PCF load information (block 830). For example, in implementations described above in connection with FIG. 6, busy period information generator 600 of analysis/control device 140 may receive PCF load information 150 from PDSN 110, and may generate busy period information 650 based on PCF load information 150. Busy period information 650 may include information associated with when PDSN 110 is experiencing busy conditions (e.g., a time of day when PDSN 110 is experiencing a larger load than other times of the day), etc. PCF IP/session counts generator 630 of analysis/control device 140 may receive PCF load information 150 from PDSN 110, and may generate PCF IP information 670 and number 680 of sessions per PCF based on PCF load information 150. PCF IP information 670 may include IP addresses associated with PCFs 400 at PDSN 110. Number 680 of sessions per PCF may include a number of sessions (per PCF 400) currently being processed by PDSN 110.

As further shown in FIG. 8, IP information may be received from an IP network (block 840), PCF identity information may be determined based on the IP information (block 850), and the busy period information, the PCF IP address information, the number of sessions per PCF, and the PCF identity information may be stored in a database (DB) (block 860). For example, in implementations described above in connection with FIG. 6, busy period information generator 600 of analysis/control device 140 may provide busy period information 650 to database 610 for storage. PCF IP to PCF identity generator 620 of analysis/control device 140 may receive IP information 160 from IP network 130, and may generate PCF identity information 660 based on IP information 160. PCF identity information 660 may include information identifying names of PCFs 400, geographic locations associated with PCFs 400, geographic locations associated with RNCs containing PCFs 400, etc. PCF IP to PCF identity generator 620 may provide PCF identity information 660 to database 610 for storage. PCF IP/session counts generator 630 of analysis/control device 140 may provide PCF IP information 670 and number 680 of sessions per PCF to database 610 for storage.

Returning to FIG. 8, traffic analysis and/or modeling information may be calculated based on the stored information (block 870), control information may be generated based on the stored information (block 880), and the control information may be provided to one or more PCFs and/or the PDSN to control operation thereof (block 890). For example, in implementations described above in connection with FIG. 6, analysis/control generator 640 of analysis/control device 140 may retrieve busy period information 650, PCF identity information 660, PCF IP information 670, and/or number 680 of sessions per PCF from database 610, and may determine traffic analysis/modeling 170 and/or control information 180 based on the retrieved information. In one example, analysis/control generator 640 may verify if PDSN 110 is experiencing busy conditions (e.g., a time of day when PDSN 110 is experiencing a larger load than other times of the day) based on busy period information 650. In another example, analysis/control generator 640 may correlate PCF identity information 660 with PCF IP information 670 and number 680 of sessions per PCF to determine a load on PDSN 110 from specific PCFs 400. This may enable the network user to prevent unbalanced traffic from occurring at PDSN 110, and may enable the traffic (e.g., the load) between PCFs 400 and PDSN 110 to be controlled and/or balanced.

Process block 850 may include the process blocks illustrated in FIG. 9. As shown in FIG. 9, process block 850 may include determining a geographic location of a particular PCF based on the IP information (block 900), and determining a load on the PDSN provided by the particular PCF based on the determined geographic location (block 910). For example, in implementations described above in connection with FIG. 1, analysis/control device 140 may receive IP information 160 from IP network 130, and may determine PCF identity information (e.g., geographic locations of the PCFs, etc.) based on IP information 160. Analysis/control device 140 may utilize the PCF IP addresses, the number of sessions per PCF, and the PCF identity information to analyze and/or model traffic passing through PDSN 110, as shown by reference number 170. Analysis/control device 140 may utilize the PCF IP addresses, the number of sessions per PCF, and the PCF identity information to control the PCFs and/or PDSN 110, as shown by reference number 180. Control information 180 may include information instructing the PCFs and/or PDSN 110 on how and when to provide traffic to/from PDSN 110. In one example, analysis/control device 140 may utilize the PCF IP addresses, the number of sessions per PCF, and the PCF identity information (e.g., geographic locations of the PCFs, etc.) to determine a load on PDSN 110 that is provided by each PCF.

Process block 890 may include the process blocks illustrated in FIG. 10. As shown in FIG. 10, process block 890 may include providing control information to the PDSN for controlling operation of one or more PCFs (block 1000), and preventing unbalanced traffic between the PDSN and the one or more PCFs based on the control information (block 1010). For example, in implementations described above in connection with FIG. 1, analysis/control device 140 may provide control information 180 to the PCFs and/or PDSN 110. Control information 180 may include information instructing the PCFs and/or PDSN 110 on how and when to provide traffic to/from PDSN 110. Control information 180 may enable the traffic (e.g., the load) between the PCFs and PDSN 110 to be controlled and/or balanced.

FIG. 11 depicts a flow chart of an exemplary process 1100 for analyzing and/or modeling traffic based on PCF identification according to implementations described herein. In one implementation, process 1100 may be performed by analysis/control device 140. In another implementation, some or all of process 1100 may be performed by another device or group of devices (e.g., PDSN 110), including or excluding analysis/control device 140.

As illustrated in FIG. 11, process 1100 may begin with determining whether a PDSN is experiencing a busy period (block 1110). If the PDSN is not experiencing a busy period (block 1110—NO), process 1100 may return to the beginning. If the PDSN is experiencing a busy period (block 1110—YES), a PCF session table associated with the PDSN may be accessed (block 1120). For example, in implementations described above in connection with FIG. 7, busy period verifier 700 of analysis/control device 140 may receive busy period information 760 (e.g., from PDSN 110), and may verify whether PDSN 110 is currently experiencing busy conditions. If PDSN 110 is currently experiencing busy conditions, busy period verifier 700 may provide an indication 770, verifying that PDSN 110 is currently experiencing busy conditions, to PDSN PCF session table accessor 710 of analysis/control device 140. PDSN PCF session table accessor 710 may receive indication 770, and may access a PCF session table (e.g., provided in PDSN 110) based on indication 770.

As further shown in FIG. 11, if a number of PCF sessions contained in the PCF session table is not more than one (block 1130—NO), process 1100 may return to the beginning. If the number of PCF sessions contained in the PCF session table is more than one (block 1130—YES), PCF IP address information and/or a number of sessions per PCF may be exported to a table (block 1140) and an IP control inventory database may be accessed to obtain PCF identity information (block 1150). For example, in implementations described above in connection with FIG. 7, PDSN PCF session table accessor 710 of analysis/control device 140 may retrieve PCF load information 150 from the PCF session table, and may determine, based on PCF load information 150, whether the PCF session table includes more than one PCF session. If the PCF session table includes more than one PCF session, PDSN PCF session table accessor 710 may provide, to PCF IP/session counts exporter 720, an indication 780 that the PCF session table includes more than one PCF session. If the PCF session table does not include more than one PCF session, analysis/control device 140 may retrieve busy period information 760 again (e.g., via busy period verifier 700). PCF IP/session counts exporter 720 of analysis/control device 140 may receive indication 780, and may access PCF load information 150 (e.g., from PDSN 110) based on indication 780. PCF IP/session counts exporter 720 may extract PCF IP information 670 and number 680 of sessions per PCF (FIG. 6) from PCF load information 150, may correlate PCF IP information 670 and number 680 of sessions per PCF, and may export the correlated PCF IP information 670 and number 680 of sessions per PCF to external table 730. IP inventory database accessor 740 of analysis/control device 140 may access IP control inventory database 500 (FIG. 5), and may retrieve IP information 160 from IP control inventory database 500.

Returning to FIG. 11, if there is no correlation between the PCF IP address information and the PCF identity information (block 1160—NO), the IP control inventory database may be updated (block 1170). Otherwise (block 1160—YES), traffic analysis and/or modeling information may be calculated based on the PCF IP address information, the number of sessions per PCF, and the PCF identity information (block 1180) and the traffic analysis/modeling information may be provided to a user (block 1190). For example, in implementations described above in connection with FIG. 7, IP inventory database accessor 740 of analysis/control device 140 may determine if there is a correlation between PCF identity information 660 and PCF IP information 670. If there is a correlation between PCF identity information 660 and PCF IP information 670, IP inventory database accessor 740 may provide, to analysis/model calculator 750, an indication 790 that there is a correlation. If there is no correlation between PCF identity information 660 and PCF IP information 670, IP inventory database accessor 740 may update IP control inventory database 500 with such information. Analysis/model calculator 750 of analysis/control device 140 may receive correlation indication 790 from IP inventory database accessor 740, and may generate traffic analysis/modeling 170 based on indication 790. Analysis/model calculator 750 may provide traffic analysis/modeling 170 for display to a network user, to a storage device (e.g., for retrieval and review by the network user), and/or to a device (e.g., a computer) associated with the network user.

Implementations described herein may provide systems and/or methods that analyze and/or control traffic (e.g., that passes through a PDSN) based on PCF identification. In one implementation, for example, the systems and/or methods may receive load information associated with one or more PCFs coupled to a PDSN, and may determine PCF IP addresses and a number of sessions per PCF based on the load information. The systems and/or methods may receive IP information from an IP network, and may determine PCF identity information (e.g., geographic locations of the PCFs, etc.) based on the IP information. The systems and/or methods may utilize the PCF IP addresses, the number of sessions per PCF, and the PCF identity information to analyze (or model) traffic passing through the PDSN and to control the PCFs and/or the PDSN. Such an arrangement may enable the traffic (e.g., the load) between the PCFs and the PDSN to be controlled and/or balanced.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8-11, the order of the blocks may be modified in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
   receiving, by the computing device, packet control function (PCF) load information associated with a packet data serving node (PDSN);
   determining, by the computing device, PCF Internet protocol (IP) address information and a number of sessions per PCF based on the PCF load information;
   receiving, by the computing device, IP information from an IP network associated with the PDSN;
   determining, by the computing device, PCF identity information based on the IP information;
   generating, by the computing device, control information based on the PCF IP address information, the number of sessions per PCF, and the PCF identity information; and
   providing, by the computing device, the control information to the PDSN to control operation of the PDSN.

2. The computing device-implemented method of claim 1, further comprising:
   determining busy period information based on the PCF load information; and
   determining the control information based on the busy period information, the PCF IP address information, the number of sessions per PCF, and the PCF identity information.

3. The computing device-implemented method of claim 2, further comprising:
   storing the PCF IP address information, the number of sessions per PCF, the PCF identity information, and the busy period information in a database associated with the computing device.

4. The computing device-implemented method of claim 1, further comprising at least one of:
   calculating traffic analysis information for the PDSN based on the PCF IP address information, the number of sessions per PCF, and the PCF identity information; or
   calculating modeling information for the PDSN based on the PCF IP address information, the number of sessions per PCF, and the PCF identity information.

5. The computing device-implemented method of claim 1, where determining PCF identity information comprises:
   determining, based on the IP information, a geographic location of a particular PCF associated with the PDSN; and
   determining, based on the determined geographic location, a load on the PDSN provided by the particular PCF.

6. The computing device-implemented method of claim 1, where providing the control information to the PDSN comprises:
   providing the control information to the PDSN for controlling operation of one or more PCFs associated with the PDSN; and
   preventing unbalanced traffic between the PDSN and the one or more PCFs based on the control information.

7. The computing device-implemented method of claim 6, where the control information includes information instructing the PDSN and the one or more PCFs on how and when to provide traffic between the PDSN and the one or more PCFs.

8. The computing device-implemented method of claim 1, where the computing device is incorporated within the PDSN.

9. The computing device-implemented method of claim 1, where the PCF identity information comprises geographic locations of one or more radio network controllers connected to the PDSN.

10. The computing device-implemented method of claim 1, further comprising:
   determining whether the PDSN is experiencing busy conditions based on the PCF load information; and
   accessing a PCF session table associated with the PDSN when the PDSN is experiencing busy conditions, where the PCF session table includes the PCF IP address information and the number of sessions per PCF.

11. The computing device-implemented method of claim 10, further comprising:
   determining whether the number of sessions per PCF is more than one; and
   accessing an IP control inventory database associated with the IP network, to determine the PCF identity information, when the number of sessions per PCF is more than one.

12. The computing device-implemented method of claim 11, further comprising:
   determining whether there is a correlation between the PCF IP address information and the PCF identity information;
   updating the IP control inventory database when there is no correlation between the PCF IP address information and the PCF identity information; and
   calculating traffic analysis information for the PDSN, based on the PCF IP address information, the number of sessions per PCF, and the PCF identity information, when there is a correlation between the PCF IP address information and the PCF identity information.

13. The computing device-implemented method of claim 12, further comprising:
   providing the traffic analysis information for display to a network user.

14. A device, comprising:
   a memory to store a plurality of instructions; and
   a processor to execute instructions in the memory to:
      receive packet control function (PCF) load information associated with a packet data serving node (PDSN),
      determine PCF Internet protocol (IP) address information and a number of sessions per PCF based on the PCF load information,
      receive IP information from an IP network associated with the PDSN,
      determine PCF identity information based on the IP information,
      store the PCF IP address information, the number of sessions per PCF, and the PCF identity information in the memory,
      generate control information based on the PCF IP address information, the number of sessions per PCF, and the PCF identity information, and
      provide the control information to the PDSN, and to one or more PCFs associated with the PDSN, to control operation of the PDSN and the one or more PCFs.

15. The device of claim 14, where the processor is further to execute instructions in the memory to:
   determine busy period information based on the PCF load information, and
   determine the control information based on the busy period information, the PCF IP address information, the number of sessions per PCF, and the PCF identity information.

16. The device of claim 14, where the processor is further to execute instructions in the memory to:
   calculate traffic analysis information for the PDSN based on the PCF IP address information, the number of sessions per PCF, and the PCF identity information, and
   provide the traffic analysis information for display to a network user.

17. The device of claim 14, where the processor is further to execute instructions in the memory to:
   determine, based on the IP information, a geographic location of a particular PCF of the one or more PCFs; and
   determine, based on the determined geographic location, a load on the PDSN provided by the particular PCF.

18. The device of claim 14, where the processor is further to execute instructions in the memory to:
   prevent unbalanced traffic between the PDSN and the one or more PCFs based on the control information.

19. The device of claim 14, where the control information includes information instructing the PDSN and the one or more PCFs on how and when to provide traffic between the PDSN and the one or more PCFs.

20. The device of claim 14, where the PCF identity information comprises geographic locations of one or more radio network controllers connected to the PDSN.

21. The device of claim 14, where the processor is further to execute instructions in the memory to:
   determine whether the PDSN is experiencing busy conditions based on the PCF load information, and
   access a PCF session table associated with the PDSN when the PDSN is experiencing busy conditions, where the PCF session table includes the PCF IP address information and the number of sessions per PCF.

22. The device of claim 21, where the processor is further to execute instructions in the memory to:
   determine whether the number of sessions per PCF is more than one, and
   access an IP control inventory database associated with the IP network, to determine the PCF identity information, when the number of sessions per PCF is more than one.

23. The device of claim 22, where the processor is further to execute instructions in the memory to:
   determine whether there is a correlation between the PCF IP address information and the PCF identity information,
   update the IP control inventory database when there is no correlation between the PCF IP address information and the PCF identity information, and
   calculate traffic analysis information for the PDSN, based on the PCF IP address information, the number of sessions per PCF, and the PCF identity information, when there is a correlation between the PCF IP address information and the PCF identity information.

24. The device of claim 23, where the processor is further to execute instructions in the memory to:
   provide the traffic analysis information for display to a network user.

25. A device, comprising:
   means for receiving packet control function (PCF) load information associated with a packet data serving node (PDSN);
   means for determining busy period information, PCF Internet protocol (IP) address information, and a number of sessions per PCF based on the PCF load information;

means for receiving IP information from an IP network associated with the PDSN;
means for determining PCF identity information based on the IP information;
means for generating control information based on the busy period information, the PCF IP address information, the number of sessions per PCF, and the PCF identity information;
means for providing the control information to the PDSN to control operation of the PDSN;
means for calculating traffic analysis information for the PDSN based on the PCF IP address information, the number of sessions per PCF, and the PCF identity information; and
means for providing the traffic analysis information for display to a network user.

* * * * *